United States Patent
Fujiya

[11] Patent Number: 5,803,527
[45] Date of Patent: Sep. 8, 1998

[54] SECTIONAL CONFIGURATION OF CORNER IN WINDOW MOLDING

[75] Inventor: Hiroki Fujiya, Wako, Japan

[73] Assignee: Honda Giken Kogyo Kabushiki Kaisha, Tokyo, Japan

[21] Appl. No.: 702,877

[22] Filed: Aug. 26, 1996

[30] Foreign Application Priority Data

Sep. 1, 1995 [JP] Japan .................................. 7-225549

[51] Int. Cl.$^6$ ........................................................ B60J 10/02
[52] U.S. Cl. .......................... 296/93; 296/146.15; 52/208
[58] Field of Search ......................... 296/93, 201, 96.21, 296/146.15; 52/208, 204.597

[56] References Cited

U.S. PATENT DOCUMENTS

| | | | |
|---|---|---|---|
| 4,757,659 | 7/1988 | Miyakawa et al. | 296/93 |
| 5,248,179 | 9/1993 | Biermacher et al. | 296/93 X |
| 5,429,844 | 7/1995 | Galardi | 296/93 X |
| 5,456,049 | 10/1995 | Goto et al. | 296/93 X |
| 5,480,504 | 1/1996 | Gold | 296/201 X |
| 5,538,314 | 7/1996 | Young et al. | 296/93 X |
| 5,549,346 | 8/1996 | Gold | 296/93 |
| 5,603,546 | 2/1997 | Desir, Jr. | 296/93 |

FOREIGN PATENT DOCUMENTS 1-249318  10/1989  Japan .

*Primary Examiner*—Joseph D. Pape
*Attorney, Agent, or Firm*—Armstrong, Westerman, Hattori, McLeland & Naughton

[57] ABSTRACT

At a corner of a window molding (M) mounted between a peripheral edge (1) of a window pane (G) and a vehicle body panel (P), a seal lip (4) of the window molding (M) is prevented from being floated from an outer surface (3) of the vehicle body panel (P). A sectional configuration of the window molding (M) includes a window pane-fitted groove ($2_1$) which is provided at one end and into which the peripheral edge (1) of the window pane (G) is fitted, and a seal lip (4) provided at the other end to abut against the outer surface (3) of the vehicle body panel (P). The sectional configuration further includes a cut-off portion ($2_2$) which is triangular is cross-section and which is provided in a back surface of the window molding (M) corresponding to the corner. The cut-off portion ($2_2$) ensures that main axes X and Y of a section of the window molding (M) can be allowed to substantially correspond to reference lines $X_0$ and $Y_0$ extending along the surface and end face of the window pane (G), and the window molding (M) can be smoothly curved in a plane parallel to the window pane (G), thereby preventing floating of the seal lip (4) from the outer surface (3) of the vehicle body panel (P).

8 Claims, 5 Drawing Sheets

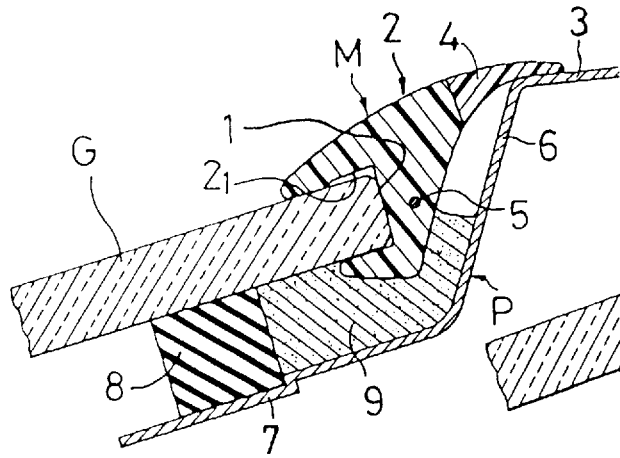
FIG.3A
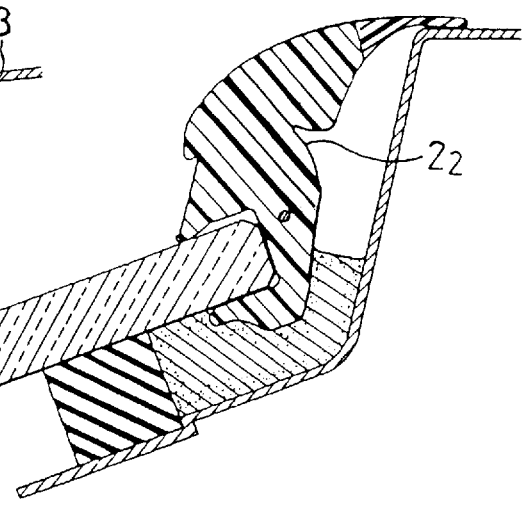
FIG.3D
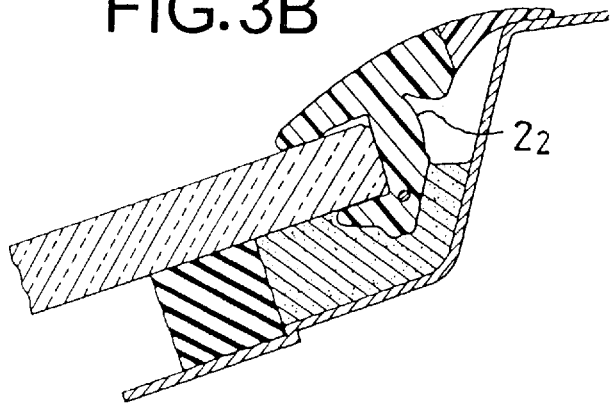
FIG.3B
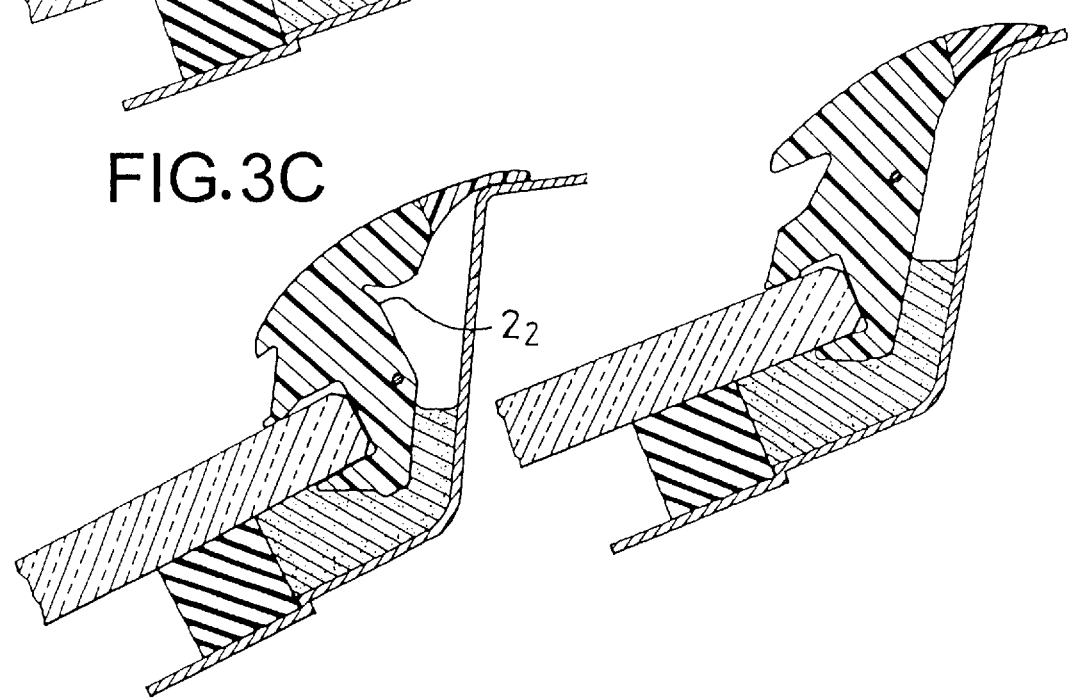
FIG.3C
FIG.3E

SECTIONAL CONFIGURATION OF CORNER IN WINDOW MOLDING

BACKGROUND OF THE INVENTION

Field of the Invention

The present invention relates to a sectional configuration of a corner in a window molding, the window mole being provided at one end of a section thereof with a window pane-fitted groove into which a peripheral edge of a window pane is fitted, and at the other end of the section of the window molding with a seal lip for resiliently abutting against an outer surface of a vehicle body panel.

A window molding mounted between a peripheral edge of a window pane and a vehicle body panel is formed by extrusion from a synthetic resin having a flexibility, and at a corner of the window pane, the window molding is curved to follow the curvature of the peripheral edge of the corner.

There is a conventionally known sectional configuration in which for the purpose of firmly fixing such a window molding to the vehicle body panel, a plurality of fins are integrally formed at a leg extending from a head of the window molding and locked to protrusions formed on the vehicle body panel (see Japanese Patent Application Laid-open No. 1-249318).

The above known window molding suffers from a problem that the smooth curvature of the corner is impeded by the presence of the fins. Therefore, the window molding is liable to be curved in a direction perpendicular to the surface of the window pane and floated from the vehicle body panel. Therefore, it is a conventional practice to insure the smooth curvature of the window molding at the corner to prevent the floating of the window molding from the vehicle body panel by cutting portions of the fins at the corner of the window molding.

However, the floating phenomenon at the corner of the window molding is generated even in a window molding of a type which has no fins and hence, a countermeasure therefor was expected.

SUMMARY OF THE INVENTION

The present invention has been accomplished with the above circumstance in view, and it is an object of the present invention to enhance the followability of the window molding to the corner of the window pane to prevent the seal lip of the window molding from being floated from the vehicle body panel.

To achieve the above object in the present invention, there is provided a sectional configuration of a corner in a window molding, the window molding being provided at one end of a section thereof with a window pane-fitted groove into which a peripheral edge of a window pane is fitted, and at the other end of the section of the window molding with a seal lip for resiliently abutting against an outer surface of a vehicle body panel, wherein the window molding is formed, with a cut-off portion which is triangular in section, at a portion of the window molding corresponding to a corner of the window pane at inner side of a vehicle body between the window pane-fitted groove and the seal lip.

According to an additional feature of the present invention as described above, the cut-off portion is continuously provided at a bottom thereof with a groove which is hollowed toward outside of the vehicle body.

BRIEF DESCRIPTION OF THE DRAWINGS

FIGS. 3A, 3B, 3C, 3D and 3E are sectional views taken along lines A—A, B—B, C—C, D—D and E—E in FIG. 2, respectively.

DETAILED DESCRIPTION OF THE PREFERRED EMBODIMENT

The present invention will now be described by way of an embodiment with reference to the accompanying drawings.

Figure 1:
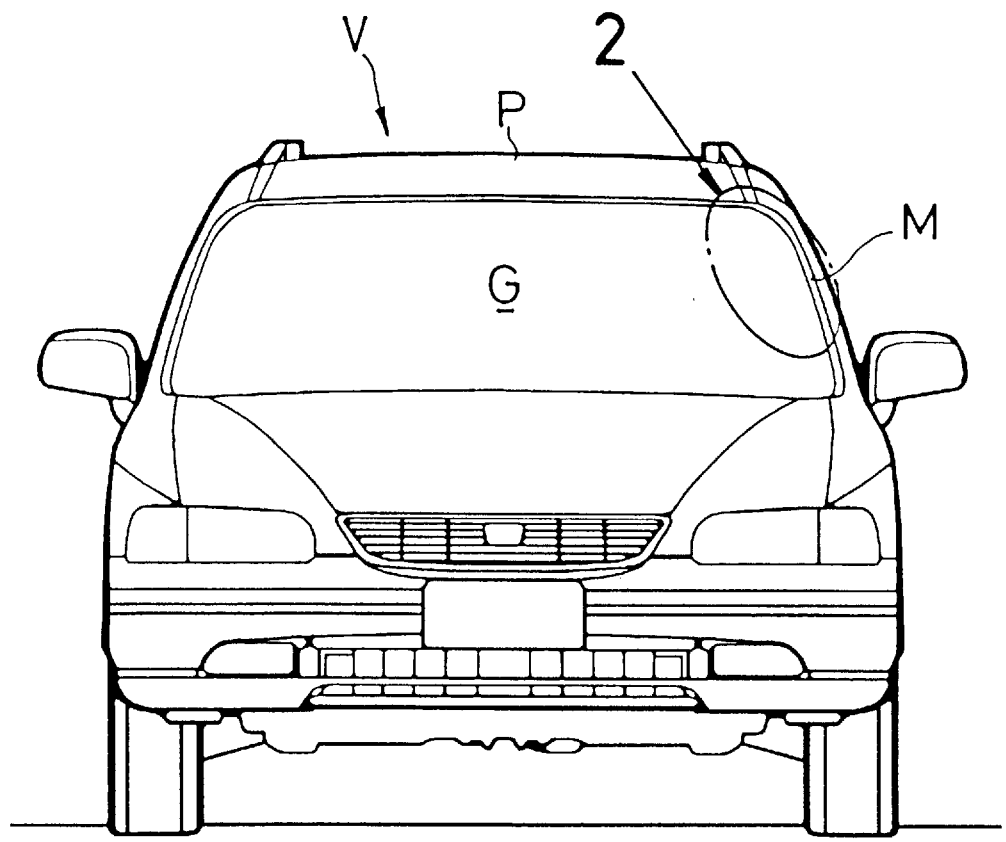
FIG. 1 is a front view of a vehicle.

As shown in FIG. 1, a window molding M made of a synthetic resin is mounted on a peripheral edge of a front window pane G mounted on a front face of a vehicle V. A gap between the peripheral edge of the window pane G and a vehicle body panel P (such as a roof, a front pillar and the like) is closed by the window molding M.

Figure 4:
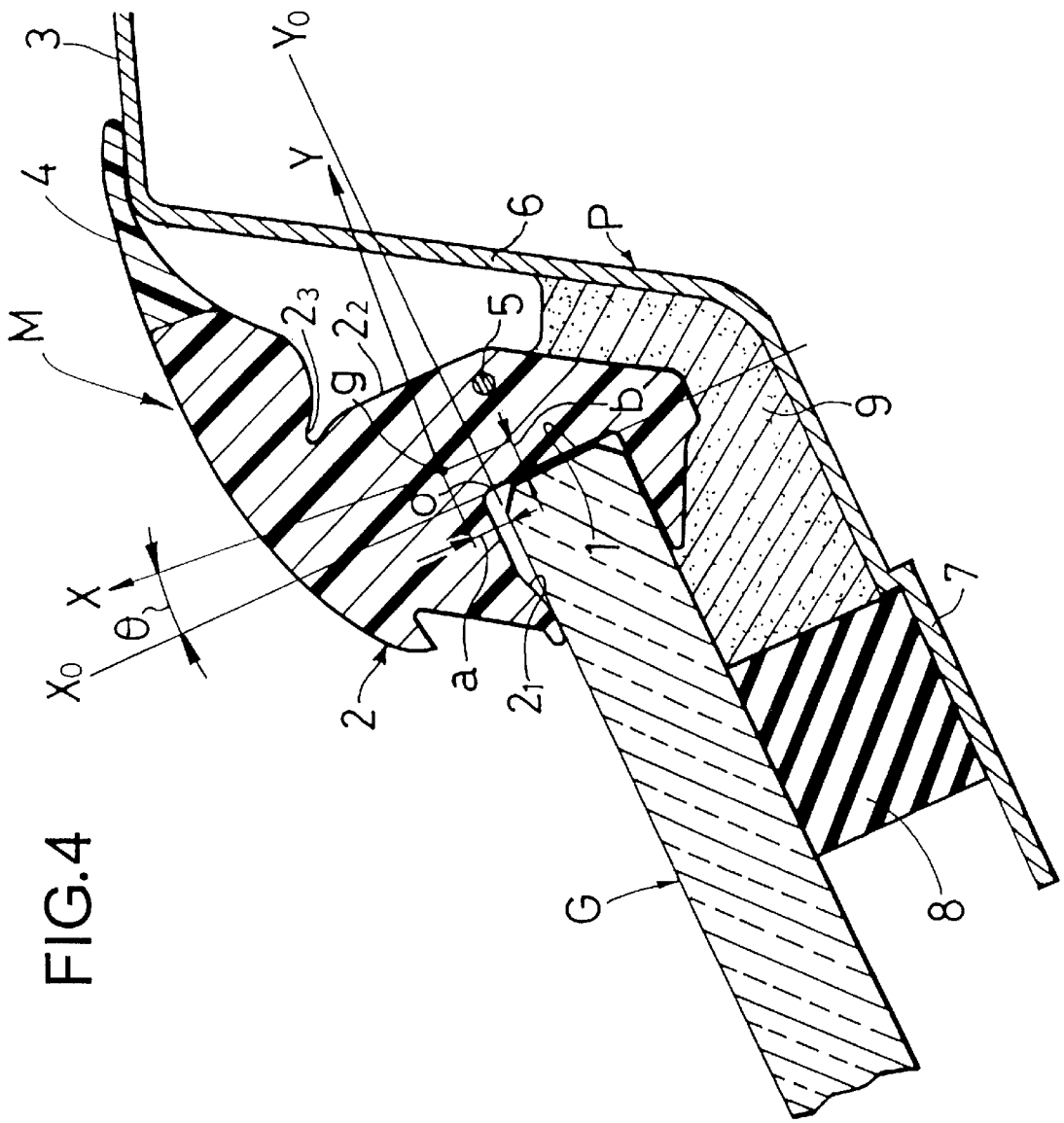
FIG. 4 is an enlarged view of FIG. 3C.

Fig.4 shows a section of the window pane at a corner thereof. The window molding M is composed of a body portion 2 having a window pane-fitted groove $2_1$ in which the peripheral edge 1 of the window pane G is fitted, a tongue piece-like seal lip 4 mounted on the opposite side of the body portion 2 from the window pane-fitted groove $2_1$ to resiliently abut against an outer surface 3 of the vehicle body panel P, and a metal core 5 made of a linear material embedded in the body portion 2.

The body portion 2 is formed from a relatively hard synthetic resin to increase the holding force for the window pane G, and the seal lip 4 is formed from a relatively soft synthetic resin to enhance the adhesion property with respect to the outer surface 3 of the vehicle panel P. The body portion 2 and the seal lip 4 are formed integrally by simultaneously extruding two materials. In this case, the metal core 5 is integrally embedded in the body portion 2. The sectional configuration of the window molding M is changed lengthwise by controlling the shape of a variable extruding bore in an extruder.

A cut-off portion $2_2$ which is triangular in section is formed in the window molding M at inner side of the vehicle body (i.e., a surface of the window molding M opposed to a stepped portion 6 of the vehicle body panel P) between the window pane-fitted groove $2_1$, and the seal lip 4. The cut-off portion $2_2$ is recessed or hollowed in the window molding M from the inner side toward the outer side of the vehicle body. A groove $2_3$ is continuously provided in the deepest area of the cut-off portion $2_2$ toward the outer side of the vehicle body.

The window pane G abuts against a support portion 7 of the vehicle body pane P through a dam rubber 8. The window pane G and the window molding M are fixed to the support portion 7 and the stepped portion 6 of the vehicle body panel P outside the dam rubber 8 with an adhesive 9.

Figure 2:
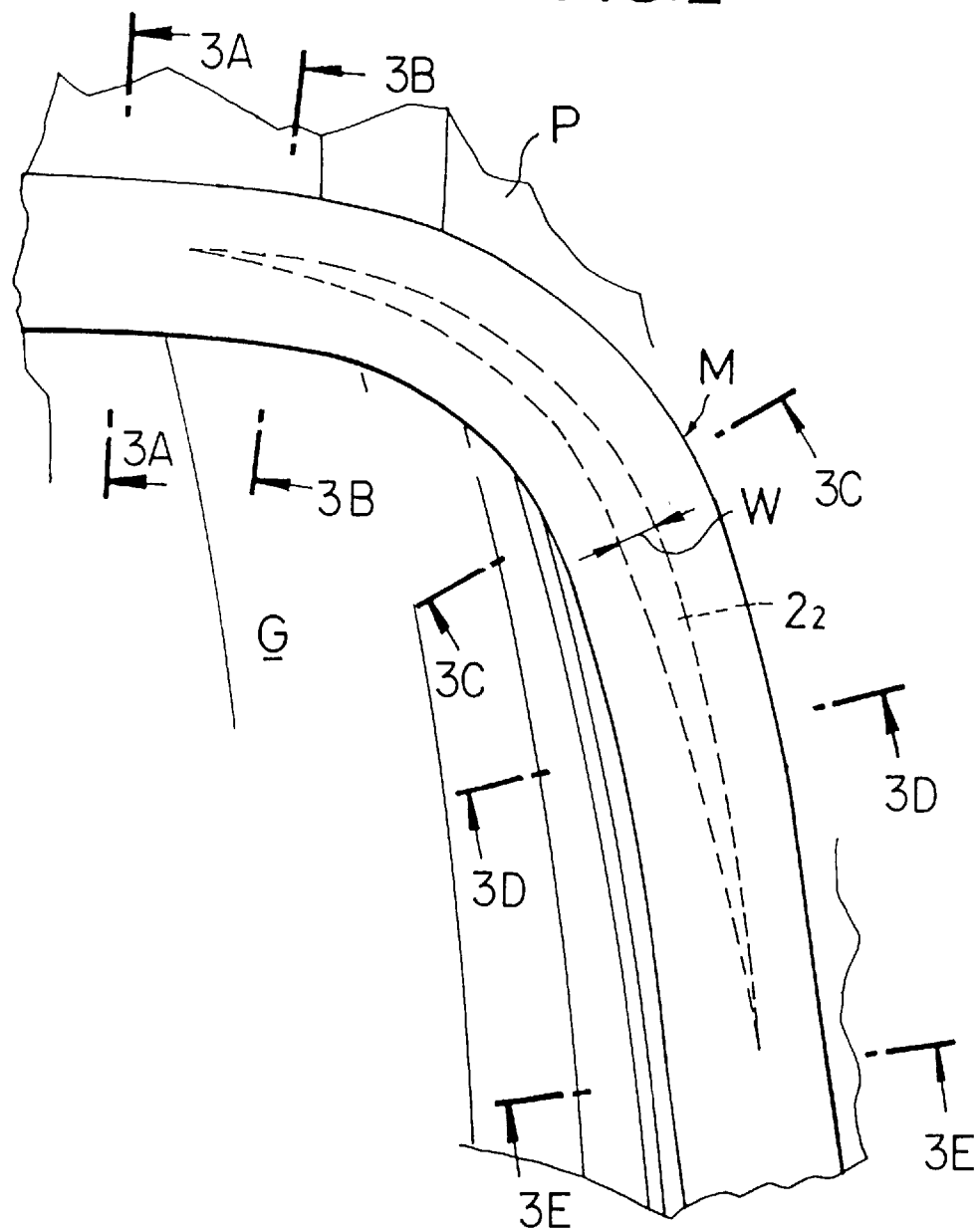
FIG. 2 is an enlarged view of a portion indicated by 2 in FIG. 1.

As can be seen from FIGS. 2 and 3, the width W of the cut-off portion $2_2$ of the window molding M is gradually increased from an entrance of the corner of the window pane G (see FIG. 3A corresponding to a section A—A); maximized at a central portion of the corner (see Fig.3C corresponding to a section C—C) and gradually decreased toward an exit of the corner (see Fig.3E corresponding to a section E—E).

The operation of the embodiment of the present invention having the above-described construction will be described below, while comparing the present invention shown in FIG. 4 with the prior art shown in FIG. 5.

Figure 5:
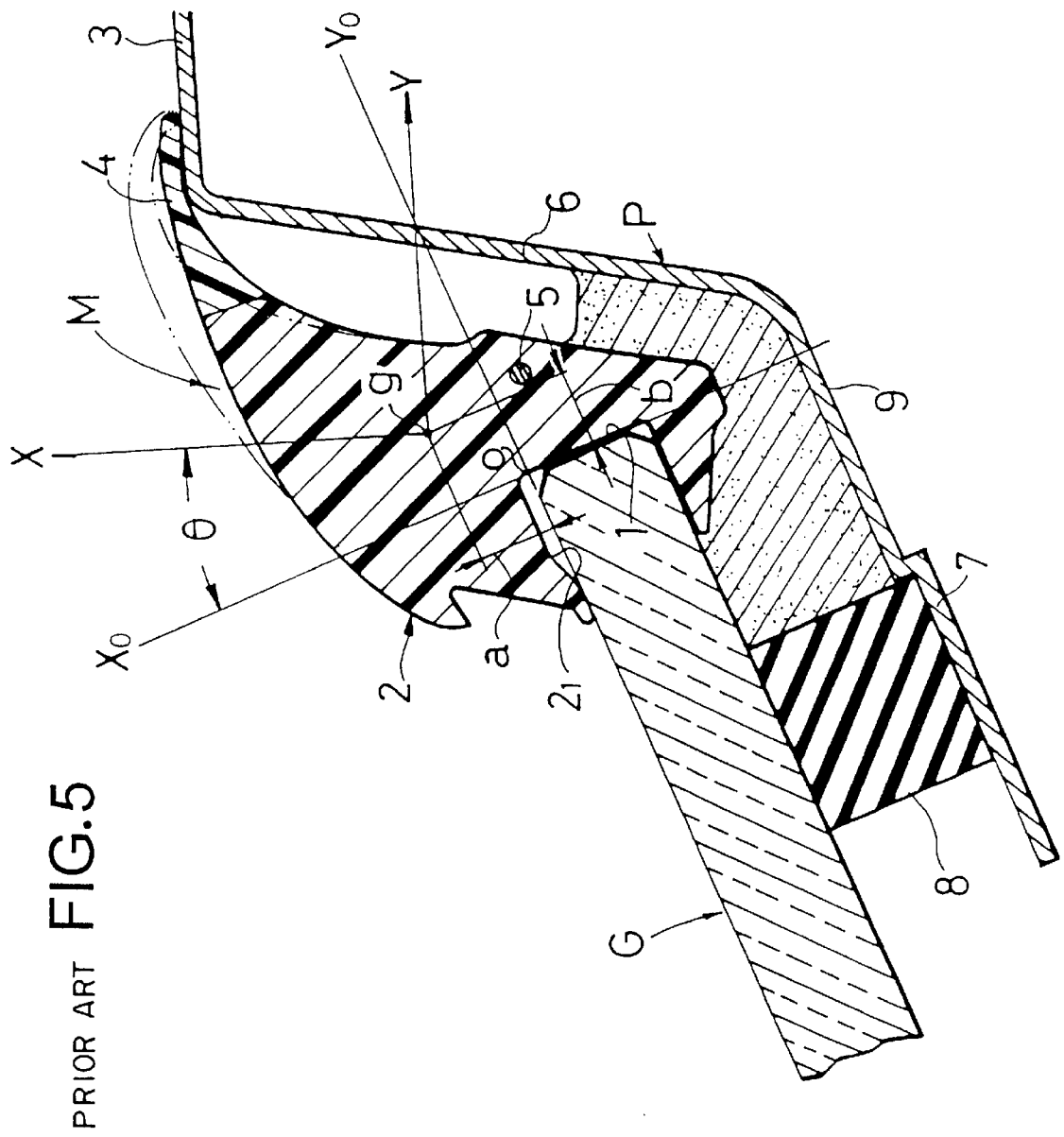
FIG. 5 is a view similar to FIG. 2, but illustrating a known sectional configuration.

The conventionally known sectional configuration shown in FIG. 5 is different from the sectional configuration of the present invention only in that the window molding M has no cut-off portion $2_2$. Therefore, the known sectional configuration is accompanied by a problem that the seal lip 4 of the window molding M is liable to be floated from the outer surface 3 of the vehicle body panel P as shown by a dashed line.

The reason why the seal lip 4 is liable to be floated will be described with reference to Fig.5. The window molding M is bent at the corner of the window pane G along the peripheral edge 1 of the window pane G. If the window molding M is considered as a phantom beam, this state corresponds to a state in which a bending moment has been applied to the beam. A reference line extending along an end face of the window pane G is represented by $X_0$, and a reference line extending along the surface of the window pane G perpendicularly to the reference line $X_0$ is represented by $Y_0$. To allow the window molding M to be smoothly curved while avoiding the floating of the seal lip 4, it is desirable that a centroid g in the section of the window molding M is allowed to correspond to an origin o of the reference lines $X_0$ and $Y_0$, and main axes X and Y (axes in which a secondary moment of the section about the centroid g is maximized and minimized) of the section represented by two straight lines perpendicular to each other and passing through the centroid g are allowed to correspond to the reference lines $X_0$ and $Y_0$.

Thus, if the main axes X and Y of the section can be allowed to correspond to the reference lines $X_0$ and $Y_0$, when the window molding M is intended to be curved about the reference line $X_0$, window molding M can be curved smoothly in a plane of the reference line $Y_0$ (in a plane of the window pane G). In the known sectional configuration shown in FIG. 5, however, because the angle θ (formed by the main axes X and Y of the section and the reference lines $X_0$ and $Y_0$ is increased, the window molding M is curved in a direction offset from the reference line $Y_0$ and as a result, the seal lip 4 is floated from the outer surface 3 of the vehicle body panel P. Moreover, because distances a and b from the origin o to centroid g are increased, a neutral axis (an axis passing through the centroid g) of the section which is intrinsically not expanded and contracted is also forcibly expanded about the reference line $Y_0$. Moreover, at a position corresponding to the seal lip 4 further spaced apart from the reference line $X_0$ the displacement is further increased and hence, the amount of seal lip 4 floated is further increased.

On the other hand, in the sectional configuration according to the present invention shown in FIG. 4, by the fact that the cut-off portion $2_2$ is formed, the centroid g of the section is defined at a location closer to the origin o, and the main axes X and Y of the section are rotated in a counterclockwise direction as viewed in FIG. 4, leading to a decreased angle θ. Therefore, the main axes X and Y of the section can be allowed to correspond to the reference lines $X_0$ and $Y_0$. Thus, when the window molding M is intended to be curved about the reference line $X_0$, the window molding M can be smoothly curved in the plane of the reference line $Y_0$ and prevented from being curved in a non-intended direction, and the seal lip 4 can be brought into a close contact with the outer surface 3 of the vehicle body panel P.

In this way, the floating of the seal lip 4 at the corner can be prevented only by the formation of the cut-off portion $2_2$ in the back surface of the corner of the window molding M and hence, the appearance of the window molding M can be improved at a low cost, and the commercial value of the window molding M can be enhanced.

Although the embodiment of the present invention has been described in detail, it will be understood that the present invention is not limited to the above-described embodiment, and various modifications in design may be made without departing from the subject matter and scope of the invention defined in claims.

For example, although the recess $2_3$ is formed in the bottom of the cut-off portion $2_2$ to place the main axes X and Y of the section at a location closer to the reference lines $X_0$ and $Y_0$ in the embodiment, the cut-off portion $2_2$ may be formed into a simple triangular section and the recess $2_3$ may be omitted. Even in this case, a sufficient effect can be exhibited. When a cut-off portion $2_2$ is formed in an area other than the corner (in a straight area) of the window molding M, there is a possibility that the wall thickness of the body portion 2 of the window molding M may be decreased, resulting in an insufficient assembling rigidity. For this reason, it is suitable that the cut-off portion $2_2$ is formed only at the corner.

As discussed above, according to the preferred embodiment of the present invention, the cut-off portion triangular in section is formed in the vehicle body inner portion corresponding to the corner of the window pane at the middle location between the window pane-fitted groove and the seal lip. Therefore, the direction of the main axes of the section can be allowed to substantially correspond to the direction of curvature of the window molding, and the centroid of the section can be defined at the location closer to the peripheral edge of the window pane. Thus, the curvature of the window molding in the non-intended direction can be limited to prevent the floating of the seal lip.

According to a further feature of the present invention, a groove recessed toward the outside of the vehicle body is provided at the bottom of the cut-off portion triangular in section. Therefore, the direction of the main axes of the section can be allowed to substantially correspond to the direction of curvature of the window molding with a further good accuracy, and the centroid of the section can be defined at a location closer to the peripheral edge of the window pane.

I claim:

1. A sectional configuration of a corner in a window molding for use with a vehicle body, comprising:

said window molding being provided, at a first end of a section of said sectional configuration, with a window pane-fitted groove ($2_1$) into which a peripheral edge (1) of a window pane (G) is fitted and at a second opposed end of said section of said window molding with a seal lip (4) for resiliently abutting against an outer surface of a vehicle body panel (P); wherein said window molding is formed, with a cut-off portion ($2_2$) which is triangular in section, at a portion of said window molding corresponding to a corner of said window pane (G) between said window pane-fitted groove ($2_1$) and said seal lip (4), said cut-off portion ($2_2$) being recessed from an inner side toward an outer side of said vehicle body.

2. The sectional configuration of a corner in a window molding according to claim 1, wherein a groove ($2_3$), which is hollowed toward an outside of said vehicle body is continuously provided at a bottom of said cut-off portion ($2_2$).

3. The sectional configuration of a corner in a window molding according to claim 1, wherein said peripheral edge of said window pane (G) is enclosed on three sides by said window pane-fitted groove ($2^2$).

4. The sectional configuration of a corner in a window molding according to claim 1, wherein said cut-off portion ($2_2$) is open to said vehicle body panel (P) in a mounted state of said window molding.

5. The sectional configuration of a corner in a window molding according to claim 1, wherein said window molding is free of said cut-off portion in an area thereof other than said portion corresponding to said corner.

6. The sectional configuration of a corner in a window molding according to claim 4, wherein said cut-off portion ($2_2$) is directly connected to said seal lip (4).

7. The sectional configuration of a corner in a window molding according to claim 2, wherein said cut-off portion ($2_2$) is connected to said seal lip (4) via said groove ($2_3$).

8. The sectional configuration of a corner in a window molding according to claim 1, wherein said corner is a smoothly curved corner.

* * * * *